US012706107B2

(12) United States Patent
Jang et al.

(10) Patent No.: US 12,706,107 B2
(45) Date of Patent: Aug. 11, 2026

(54) METHOD AND APPARATUS FOR ENCODING/DECODING AUDIO SIGNAL

(71) Applicants: Electronics and Telecommunications Research Institute, Daejeon (KR); UIF (University Industry Foundation), Yonsei University, Seoul (KR)

(72) Inventors: Inseon Jang, Daejeon (KR); Seung Kwon Beack, Daejeon (KR); Jongmo Sung, Daejeon (KR); Tae Jin Lee, Daejeon (KR); Woo-taek Lim, Daejeon (KR); Byeongho Cho, Daejeon (KR); Hong-Goo Kang, Seoul (KR); Byeong Hyeon Kim, Seoul (KR); Jihyun Lee, Seoul (KR); Hyungseob Lim, Seoul (KR)

(73) Assignees: Electronics and Telecommunications Research Institute, Daejeon (KR); UIF (University Industry Foundation), Yonsei University, Seoul (KR)

( * ) Notice: Subject to any disclaimer, the term of this patent is extended or adjusted under 35 U.S.C. 154(b) by 169 days.

(21) Appl. No.: 18/653,233

(22) Filed: May 2, 2024

(65) Prior Publication Data

US 2024/0371383 A1 Nov. 7, 2024

(30) Foreign Application Priority Data

May 4, 2023 (KR) ........................ 10-2023-0058335

(51) Int. Cl.
*G10L 19/032* (2013.01)
*G10L 19/02* (2013.01)
*G10L 19/038* (2013.01)

(52) U.S. Cl.
CPC ........ *G10L 19/038* (2013.01); *G10L 19/0204* (2013.01)

(58) Field of Classification Search
CPC ..... G10L 19/032; G10L 19/038; G10L 25/18; G10L 25/30
See application file for complete search history.

(56) References Cited

U.S. PATENT DOCUMENTS 6,871,106 B1 * 3/2005 Ishikawa ............. G10L 19/0212 704/E19.02
7,627,469 B2 * 12/2009 Nettre ................... G10L 19/032 375/243

(Continued)

FOREIGN PATENT DOCUMENTS

CN 1131507 C * 12/2003 ......... G10L 19/0212
KR 20160098597 A * 8/2016 ........... G10L 19/038

(Continued)

OTHER PUBLICATIONS

Lim, Hyungseob, et al. “End-to-end neural audio coding in the MDCT domain.” *ICASSP 2023-2023 IEEE International Conference on Acoustics, Speech and Signal Processing* (*ICASSP*). IEEE, 2023.

*Primary Examiner* — Daniel Abebe
(74) *Attorney, Agent, or Firm* — NSIP Law

(57) ABSTRACT

A method and apparatus for encoding/decoding audio signal are provided. The encoding method includes transforming an input audio signal in a time domain into an audio signal in a frequency domain, quantizing energy of a frequency band of the audio signal in the frequency domain, generating a normal signal by normalizing the audio signal in the frequency domain according to quantized energy, obtaining a feature vector including information on the energy of the frequency band based on the normal signal and the input audio signal, quantizing the feature vector, obtaining a scale factor used to scale the normal signal based on the quantized feature vector, quantizing an adjustment signal into which the normal signal has been scaled based on the scale factor, (Continued)

and outputting bitstreams based on the quantized energy, the quantized feature vector, and the quantized adjustment signal.

14 Claims, 6 Drawing Sheets

(56) References Cited

U.S. PATENT DOCUMENTS

| | | | | |
|---|---|---|---|---|
| 8,484,022 | B1 * | 7/2013 | Vanhoucke | G06N 3/084 700/48 |
| 9,135,922 | B2 * | 9/2015 | Lee | G10L 19/038 |
| 2005/0232496 | A1 * | 10/2005 | Hemmert | G10L 15/20 382/229 |
| 2005/0267744 | A1 * | 12/2005 | Nettre | G10L 19/032 704/E19.015 |
| 2016/0247515 | A1 | 8/2016 | Koishida et al. | |
| 2021/0174815 | A1 | 6/2021 | Beack et al. | |
| 2021/0390967 | A1 | 12/2021 | Beack et al. | |
| 2022/0180881 | A1 * | 6/2022 | Xiao | G06N 3/045 |
| 2023/0186927 | A1 * | 6/2023 | Zeghidour | H03M 7/6029 704/500 |
| 2023/0335145 | A1 * | 10/2023 | Lim | G10L 19/032 |
| 2025/0246185 | A1 * | 7/2025 | Choi | G06F 16/65 |

FOREIGN PATENT DOCUMENTS

| | | | | |
|---|---|---|---|---|
| KR | 10-2154741 | B1 | 9/2020 | |
| KR | 10-2021-0070767 | A | 6/2021 | |
| WO | WO-02103682 | A1 * | 12/2002 | G10L 19/20 |

* cited by examiner

METHOD AND APPARATUS FOR ENCODING/DECODING AUDIO SIGNAL

CROSS-REFERENCE TO RELATED APPLICATION

This application claims the benefit of Korean Patent Application No. 10-2023-0058335 filed on May 4, 2023, in the Korean Intellectual Property Office, the entire disclosure of which is incorporated herein by reference for all purposes.

BACKGROUND

1. Field of the Invention

One or more embodiments relate to a method and apparatus for encoding/decoding an audio signal.

2. Description of the Related Art

Technologies for compressing and restoring an audio signal are widely used to efficiently store an audio signal in a device or to quickly transmit and receive a signal through a communication network. In particular, as the amount of media signals transmitting through the Internet gradually increases, interest in audio encoding and decoding technologies that can minimize distortion during restoration with only a small amount of compressed data is growing.

Existing standardized audio encoding technology was designed using psychoacoustics knowledge to prevent signal distortion resulting from decoding from being perceived by a person with normal hearing ability. In particular, the masking effect, which occurs when an intensity of a component having a specific natural frequency is large and which makes a signal component of an adjacent natural frequency difficult to hear, may be utilized to calculate a degree of masking for each frequency component in advance and accordingly adjust a quantization step of each frequency component in order to make quantization distortion hard to perceive during actual listening. To utilize this most effectively, a time-domain signal received as an input to an encoder may be transformed into a frequency-domain signal by using modified discrete cosine transform (MDCT) or discrete Fourier transform (DFT). The frequency-domain signal may then be transformed into a bitstream through an actual quantization process after analysis of the masking effect and may be restored to the time-domain signal through inverse transformation by a decoder.

Devices implemented in this way have already been commercialized and are being used in various fields, but components consisting of each device need to be optimized independently, which results in design difficulties in adjusting input and output between the components. To overcome these limitations, various studies have recently been conducted on an end-to-end learning model, which replaces all components of a device such as an encoder, a quantizer, and a decoder with a differentiable deep neural network structure and simultaneously optimizes an entire system to minimize distortion after final decoding. This approach is expected to help improve existing rule-based encoders and decoders in that it enables a smooth introduction of a complex nonlinear system instead of depending on a device configuration on a linear system that is easy to interpret.

The above description has been possessed or acquired by the inventor(s) in the course of conceiving the present disclosure and is not necessarily an art publicly known before the present application is filed.

SUMMARY

Embodiments provide technology for implementing a deep neural network-based end-to-end device configuration method to compress a signal in a frequency domain to allow a selective control of the intensity of a specific frequency component.

Embodiments provide technology for converting an input audio signal in a time domain to an audio signal in the frequency domain and obtaining a feature vector including information on the energy of the frequency band of the audio signal in the frequency domain.

Embodiments provide technology for quantizing the feature vector and obtaining a scale factor used to scale a normal signal from the quantized feature vector.

However, the technical aspects are not limited to the aforementioned aspects, and other technical aspects may be present.

According to an aspect, there is provided a method of encoding an audio signal including transforming an input audio signal in a time domain into an audio signal in a frequency domain, quantizing energy of a frequency band of the audio signal in the frequency domain, generating a normal signal by normalizing the audio signal in the frequency domain according to quantized energy, obtaining a feature vector including information on the energy of the frequency band based on the normal signal and the input audio signal, quantizing the feature vector, obtaining a scale factor used to scale the normal signal based on a quantized feature vector, quantizing an adjustment signal into which the normal signal has been scaled based on the scale factor, and outputting bitstreams based on the quantized energy, the quantized feature vector, and a quantized adjustment signal.

The obtaining of the feature vector may include obtaining a magnitude spectrum of the input audio signal in a frequency domain based on the input audio signal and obtaining the feature vector based on the magnitude spectrum and the normal signal.

The obtaining of the feature vector may further include generating a latent representation for extracting the information on the energy of the frequency band based on the magnitude spectrum and the normal signal and calculating the feature vector based on the latent representation.

The obtaining of the scale factor may include obtaining the scale factor for each frequency band based on the quantized feature vector, wherein a number of dimensions of the scale factor may match a total number of bands in the frequency band, and wherein a number of dimensions of the quantized feature vector may match a number of dimensions of the feature vector.

The quantizing of the adjustment signal may include generating the adjustment signal by scaling the normal signal according to the scale factor.

The outputting of the bitstreams may include outputting a first bitstream by encoding the quantized feature vector, outputting a second bitstream by encoding the quantized adjustment signal, and outputting a third bitstream by encoding the quantized energy.

According to an aspect, there is provided a method of decoding an audio signal including receiving bitstreams from an encoder, obtaining a scale factor used to inversely scale a restored adjustment signal based on a first bitstream into which a quantized feature vector is encoded, generating a restored normal signal based on the scale factor and a second bitstream into which a quantized adjustment signal is encoded, obtaining a restored audio signal in a frequency domain based on a third bitstream, into which quantized energy is encoded, and the restored normal signal, and outputting a restored audio signal in a time domain based on the restored audio signal in the frequency domain.

The obtaining of the scale factor may include obtaining a quantized feature vector by decoding the first bitstream and calculating the scale factor from the quantized feature vector.

The generating of the restored normal signal may include generating a restored adjustment signal by decoding the second bitstream and inversely scaling the restored adjustment signal according to the scale factor.

The obtaining of the restored audio signal in the frequency domain may include outputting restored energy of a frequency band of the restored audio signal in the frequency domain, based on the third bitstream and denormalizing the restored normal signal according to the restored energy.

According to an aspect, there is provided an encoding device including a memory configured to store one or more instructions and a processor configured to execute the instructions, wherein, when the instructions are executed, the processor is configured to perform a plurality of operations, and wherein the plurality of operations includes transforming an input audio signal in a time domain into an audio signal in a frequency domain, quantizing energy of a frequency band of the audio signal in the frequency domain, generating a normal signal by normalizing the audio signal in the frequency domain according to quantized energy, obtaining a feature vector including information on the energy of the frequency band based on the normal signal and the input audio signal, quantizing the feature vector, obtaining a scale factor used to scale the normal signal based on a quantized feature vector, quantizing an adjustment signal into which the normal signal has been scaled based on the scale factor, and outputting bitstreams based on the quantized energy, the quantized feature vector, and a quantized adjustment signal.

The obtaining of the feature vector may include obtaining a magnitude spectrum of the input audio signal in a frequency domain based on the input audio signal and obtaining the feature vector based on the magnitude spectrum and the normal signal.

The obtaining of the feature vector may further include generating a latent representation for extracting the information on the energy of the frequency band based on the magnitude spectrum and the normal signal and calculating the feature vector based on the latent representation.

The obtaining of the scale factor may include obtaining the scale factor for each frequency band based on the quantized feature vector, wherein a number of dimensions of the scale factor may match a total number of bands in the frequency band, and wherein a number of dimensions of the quantized feature vector matches a number of dimensions of the feature vector.

The quantizing of the adjustment signal may include generating the adjustment signal by scaling the normal signal according to the scale factor.

The outputting of the bitstreams may include outputting a first bitstream by encoding the quantized feature vector, outputting a second bitstream by encoding the quantized adjustment signal, and outputting a third bitstream by encoding the quantized energy.

Additional aspects of embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
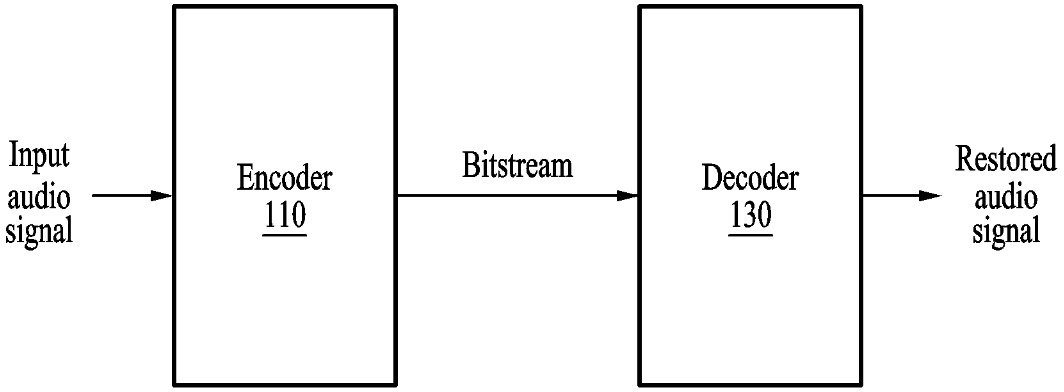
FIG. 1 is a diagram illustrating an encoder and a decoder according to an embodiment.

The following structural or functional description of examples is provided as an example only and various alterations and modifications may be made to the examples. Thus, an actual form of implementation is not construed as limited to the examples described herein and should be understood to include all changes, equivalents, and replacements within the idea and the technical scope of the disclosure.

Although terms such as first, second, and the like are used to describe various components, the components are not limited to the terms. These terms should be used only to distinguish one component from another component. For example, a “first” component may be referred to as a “second” component, and similarly, the “second” component may also be referred to as the “first” component.

It should be noted that when one component is described as being “connected,” “coupled,” or “joined” to another component, the first component may be directly connected, coupled, or joined to the second component, or a third component may be “connected,” “coupled,” or “joined” between the first and second components.

The singular forms “a,” “an,” and “the” are intended to include the plural forms as well, unless the context clearly indicates otherwise. It will be further understood that the terms “comprises/comprising” and/or “includes/including,” when used herein, specify the presence of stated features, integers, steps, operations, elements, and/or components, but do not preclude the presence or addition of one or more other features, integers, steps, operations, elements, components and/or groups thereof.

Unless otherwise defined, all terms used herein including technical and scientific terms have the same meanings as those commonly understood by one of ordinary skill in the art to which this disclosure pertains. Terms such as those defined in commonly used dictionaries are to be interpreted as having a meaning that is consistent with their meaning in the context of the relevant art and are not to be interpreted in an idealized or overly formal sense unless expressly so defined herein.

Hereinafter, the examples are described in detail with reference to the accompanying drawings. When describing the examples with reference to the accompanying drawings, like reference numerals refer to like components and a repeated description related thereto is omitted.

FIG. 1 is a diagram illustrating an encoder and a decoder according to an embodiment.

Referring to FIG. 1, an encoder 110 may encode an input audio signal to generate a bitstream and may transmit (or output) the bitstream to a decoder 130. The decoder 130 may decode the bitstream received from the encoder 110 to generate a restored audio signal.

The encoder 110 may convert an input audio signal in a time domain to an audio signal in a frequency domain. The encoder 110 may quantize energy of a frequency band of the audio signal in the frequency domain. The encoder 110 may generate a normal signal by normalizing the audio signal in the frequency domain according to the quantized energy. The encoder 110 may obtain a feature vector including information on the energy of the frequency band based on the normal signal and the input audio signal. The encoder 110 may quantize the feature vector. The encoder 110 may obtain a scale factor used to scale the normal signal based on the quantized feature vector. The encoder 110 may quantize an adjustment signal into which the normal signal has been scaled based on the scale factor. The encoder 110 may output bitstreams based on the quantized energy, the quantized feature vector, and a quantized adjustment signal. A bitstream may include a first bitstream into which the quantized feature vector is encoded, a second bitstream into which the quantized adjustment signal is encoded, and a third bitstream into which the quantized energy is encoded.

The decoder 130 may receive the bitstreams from the encoder 110. The decoder 130 may obtain a scale factor used to inversely scale a restored adjustment signal based on the first bitstream into which the quantized feature vector is encoded. The decoder 130 may generate a restored normal signal based on the scale factor and the second bitstream into which the quantized adjustment signal is encoded. The decoder 130 may obtain a restored audio signal in the frequency domain based on the third bitstream, into which the quantized energy is encoded, and the restored normal signal. The decoder 130 may output a restored audio signal in the time domain based on the restored audio signal in the frequency domain.

Figure 2:
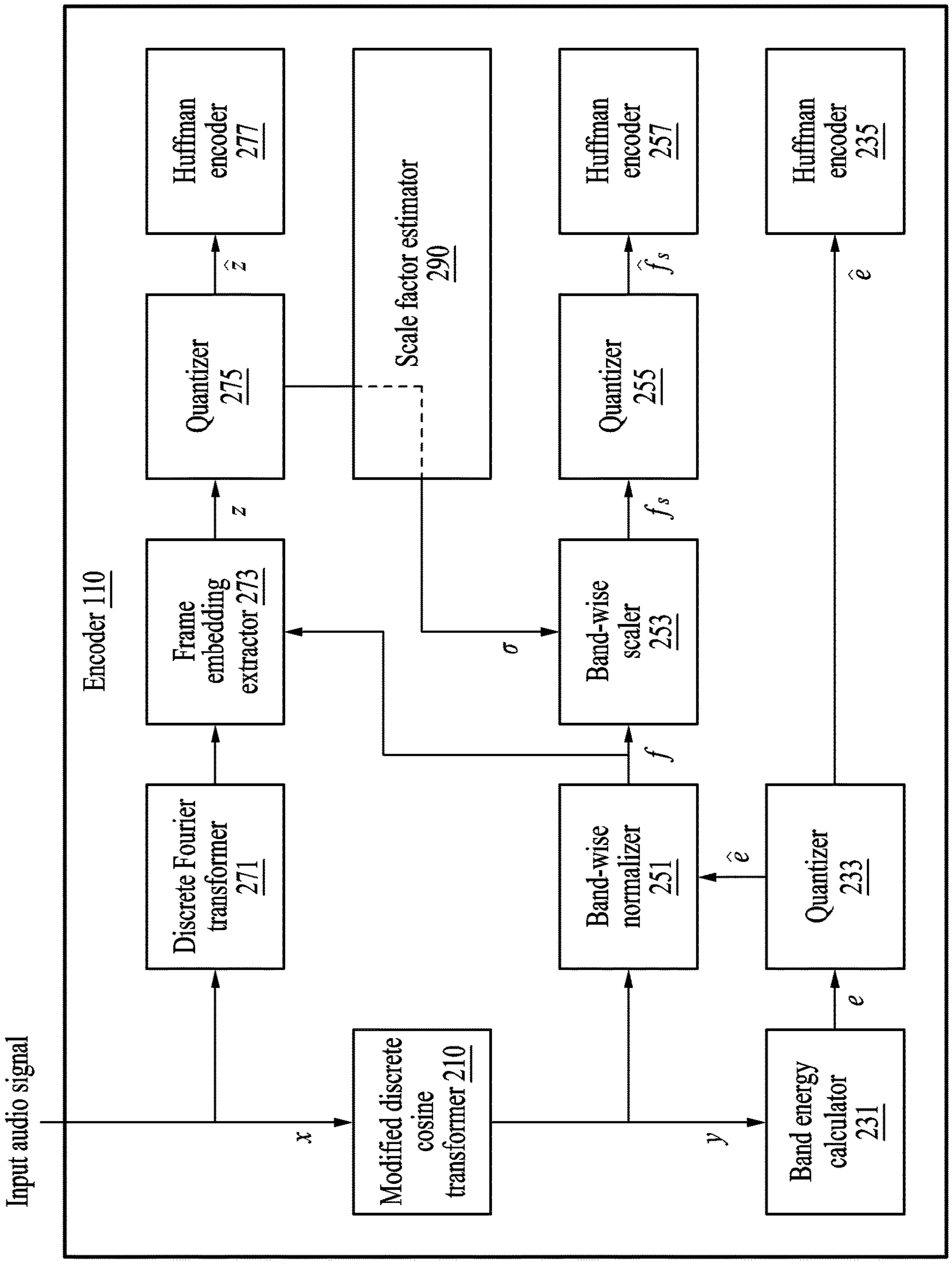
FIG. 2 is an example of a diagram of the encoder shown in FIG. 1.

FIG. 2 is an example of a diagram of the encoder 110 shown in FIG. 1.

Referring to FIG. 2, the encoder 110 may include a modified discrete cosine transformer 210, a band energy calculator 231, a quantizer (e.g., a quantizer 233, a quantizer 255, and a quantizer 275), a Huffman encoder (e.g., a Huffman encoder 235, a Huffman encoder 257, and a Huffman encoder 277), a band-wise normalizer 251, a band-wise scaler 253, a discrete Fourier transformer 271, a frame embedding extractor 273, and a scale factor estimator 290.

The encoder 110 may convert an input audio signal in a time domain to an audio signal in a frequency domain through the modified discrete cosine transformer 210. For example, the modified discrete cosine transformer 210 may extract a finite length L from the input audio signal in the time domain at intervals of L/2. The modified discrete cosine transformer 210 may multiply the frame of each audio signal by a window function having a length of L. The modified discrete cosine transformer 210 may convert the input audio signal in the time domain to the audio signal in the frequency domain having a length of L/2. A configuration of the modified discrete cosine transformer 210 is not limited by the length of the input audio signal in the time domain and a selection of a window function. However, a mutual inverse transformation relationship between the modified discrete cosine transformer 210 and an inverse modified discrete cosine converter (e.g., 370 of FIG. 3) may need to be maintained.

The encoder 110 may calculate energy of a frequency band of the audio signal in the frequency domain through the band energy calculator 231. For example, the band energy calculator 231 may divide the audio signal in the frequency domain into a plurality of bands by grouping adjacent coefficients of the audio signal in the frequency domain so that the coefficients may not overlap each other. The band energy calculator 231 may calculate average energy of the coefficients of the audio signal in the frequency domain for each band according to Equation 1. A band may include a plurality of coefficients of the audio signal in the frequency domain. Coefficients included in one band need to be adjacent to each other in the frequency domain. A different number of coefficients may be included in each band. However, one coefficient may not be included in a plurality of bands.

$$e_b = \sqrt{\sum_{i=i_b}^{i_{b+1}-1} y_i^2} \quad \text{[Equation 1]}$$

In Equation 1, b denotes an index of the band and $i_b$ denotes a frequency domain index of a first frequency component included in a b-th band. $e_b$ denotes average energy of the b-th band, and $y_i$ denotes a coefficient of the audio signal in the frequency domain.

The encoder 110 may quantize the energy of the frequency band of the audio signal in the frequency domain through the quantizer 233. For example, the quantizer 233 may be a uniform mid-thread quantizer. The quantizer 233 may quantize each band energy according to a quantization step size unique to each band after applying a log function to the band energy.

The encoder 110 may generate a normal signal by normalizing the audio signal in the frequency domain according to the quantized energy through the band-wise normalizer 251. For example, the band-wise normalizer 251 may normalize the audio signal in the frequency domain for each band based on the quantized band energy. The band-wise normalizer 251 may generate a normal signal according to Equation 2.

$$f_i = \frac{y_i}{\hat{e}_b} \quad \text{[Equation 2]}$$

In Equation 2, i denotes an index of a coefficient of the audio signal in the frequency domain and b denotes an index of a band to which the corresponding coefficient belongs. $\hat{e}_b$ is the energy of the quantized frequency band, $y_i$ is the coefficient of the audio signal in the frequency domain, and $f_i$ denotes a coefficient of the normal signal.

The encoder 110 may obtain a feature vector that includes information on the energy of the frequency band based on the normal signal and the input audio signal in the time domain. The encoder 110 may obtain a magnitude spectrum of the input audio signal in the frequency domain based on the input audio signal. The encoder 110 may obtain the feature vector based on the magnitude spectrum and the normal signal. The encoder 110 may generate a latent representation for extracting the information on the energy of the frequency band, based on the magnitude spectrum and the normal signal. The encoder 110 may calculate the feature vector based on the latent representation.

For example, the encoder 110 may obtain the magnitude spectrum of the input audio signal in the time domain through the discrete Fourier transformer 271. The discrete Fourier transformer 271 may apply a window function to the input audio signal. The discrete Fourier transformer 271 may obtain the magnitude spectrum by performing a DFT on the signal to which a window function is applied. The encoder 110 may obtain the feature vector through the frame embedding extractor 273. The frame embedding extractor 273 may generate the feature vector based on the normal signal and the magnitude spectrum. The frame embedding extractor 273 may obtain the latent representation for extracting the information on the energy of the frequency band through a convolutional neural network based on the normal signal and the magnitude spectrum. The frame embedding extractor 273 may calculate the feature vector from the latent representation through a multi-layer perceptron (MLP). The feature vector may include information on the energy of the frequency band of the audio signal in the frequency domain. The feature vector may be obtained from an energy distribution of the frequency domain.

The encoder 110 may quantize the feature vector. For example, the encoder 110 may quantize the feature vector through the quantizer 275. The quantizer 275 may be a uniform mid-thread quantizer. The quantizer 275 may allocate a quantization step size to each dimension of a feature vector having a plurality of dimensions. The quantizer 275 may quantize the feature vector for each dimension.

The encoder 110 may obtain a scale factor used to scale the normal signal based on the quantized feature vector. The encoder 110 may obtain a scale factor for each frequency band based on the quantized feature vector. A number of dimensions of the scale factor may match a total number of bands in the frequency band. A number of dimensions of the quantized feature vector may match a number of dimensions of the feature vector.

For example, the encoder 110 may obtain the scale factor through the scale factor estimator 290. The scale factor estimator 290 may be composed of an MLP having a plurality of layers but is not limited thereto. The scale factor estimator 290 may calculate the scale factor of each frequency band based on the quantized feature vector. The scale factor estimator 290 may use an exponential function to obtain a positive scale factor.

The encoder 110 may quantize an adjustment signal into which the normal signal has been scaled based on the scale factor. The encoder 110 may generate the adjustment signal by scaling the normal signal according to the scale factor. For example, the encoder 110 may generate the adjustment signal through the band-wise scaler 253. The band-wise scaler 253 may generate the adjustment signal by scaling the normal signal according to Equation 3. Normal signals included in a same band may be scaled by the same scale factor. In addition, the quantizer 255 may quantize the adjustment signal. The quantizer 255 may be a uniform mid-thread quantizer. The quantizer 255 may allocate a quantization step size to each frequency band. The normal signals included in a same frequency band may be quantized by a same quantization step size.

$$f_{s,i} = \sigma_b f_i \qquad \text{[Equation 3]}$$

In Equation 3, i denotes an index of a coefficient of the normal signal and b denotes an index of a band to which the corresponding coefficient belongs. $\sigma_b$ denotes a scale factor of a b-th band, $f_i$ denotes a coefficient of the normal signal, and $f_{s,i}$ denotes a coefficient of the adjustment signal.

The encoder 110 may output bitstreams based on the quantized energy, the quantized feature vector, and a quantized adjustment signal. The encoder 110 may output a first bitstream by encoding the quantized feature vector. The encoder 110 may output a second bitstream by encoding the quantized adjustment signal. The encoder 110 may output a third bitstream by encoding the quantized energy. The encoder 110 may output a bitstream through a Huffman encoder (e.g., the Huffman encoder 235, the Huffman encoder 257, and the Huffman encoder 277). For example, the Huffman encoder 277 may output the first bitstream by encoding the quantized feature vector. The Huffman encoder 277 may allocate a codebook to each dimension of a feature vector having a plurality of dimensions. The Huffman encoder 257 may output the second bitstream by encoding the quantized adjustment signal. The Huffman encoder 235 may output the third bitstream by encoding the quantized energy. The Huffman encoder (e.g., the Huffman encoder 235 and the Huffman encoder 257) may allocate a same codebook to each frequency band.

The Huffman encoders 235, 257, and 277 may generate a bit for determining a presence of a blank for each frequency band. For example, when the energy of the frequency band is less than or equal to a minimum threshold set by a user, the Huffman encoders 235, 257, and 277 may set a bit corresponding to the frequency band having energy less than or equal to the minimum threshold to "1." The Huffman encoders 235, 257, and 277 may not store or transmit an adjustment signal included in a frequency band having energy less than or equal to a predetermined level.

In addition, the Huffman encoders 235, 257, and 277 may receive information corresponding to a maximum number of frequency bands set by the user when generating a bitstream. The Huffman encoders 235, 257, and 277 may encode a signal only for a specified frequency band.

Figure 3:
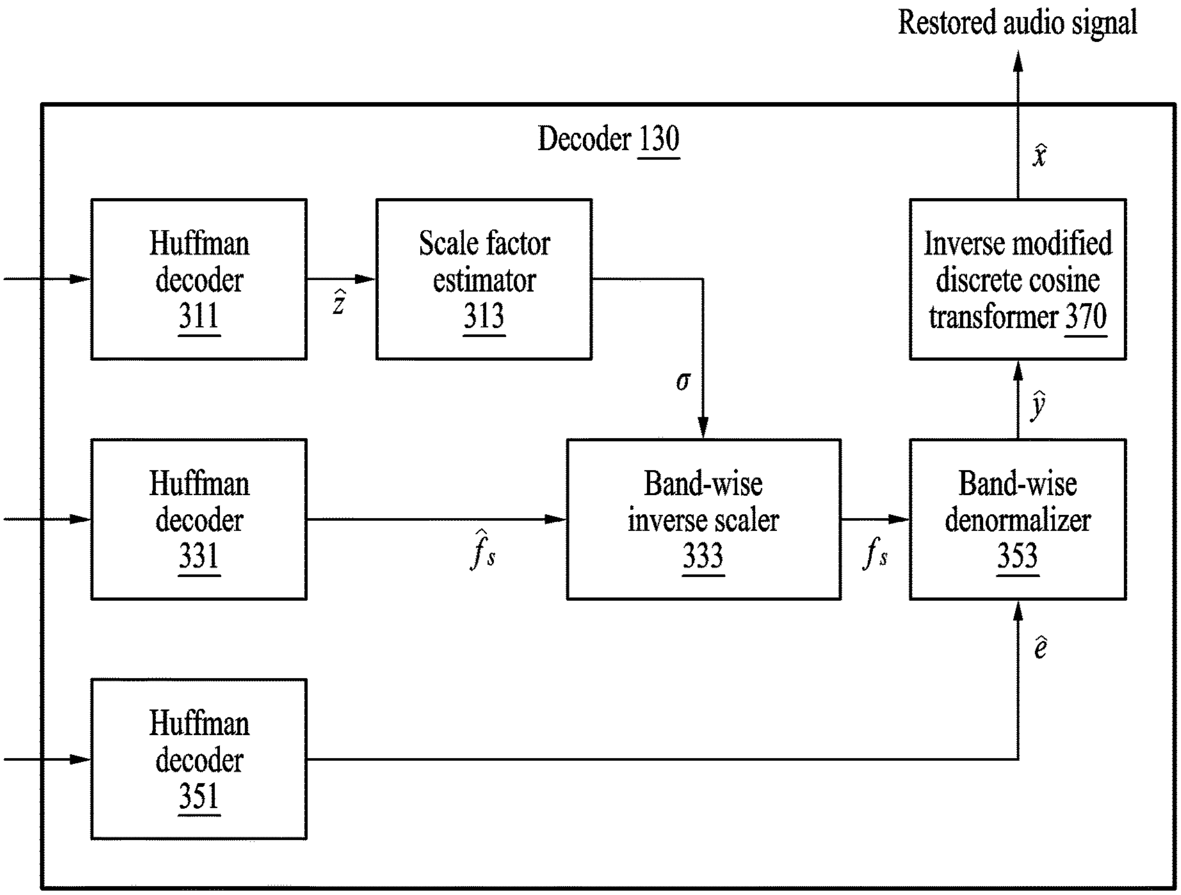
FIG. 3 is an example of a diagram of the decoder shown in FIG. 1.

FIG. 3 is an example of a diagram of the decoder 130 shown in FIG. 1.

Referring to FIG. 3, the decoder 130 may include a Huffman decoder (e.g., a Huffman decoder 311, a Huffman decoder 331, and a Huffman decoder 351), a scale factor estimator 313, a band-wise inverse scaler 333, a band-wise denormalizer 353, and an inverse modified discrete cosine transformer 370.

The decoder 130 may obtain a scale factor used to inversely scale a restored adjustment signal based on a first bitstream into which a quantized feature vector is encoded. The decoder 130 may obtain the quantized feature vector by decoding the first bitstream. The decoder 130 may calculate the scale factor from the quantized feature vector. For example, the decoder 130 may obtain the quantized feature vector by decoding the first bitstream through the Huffman decoder 311. The Huffman decoder 311 may decode the first bitstream using a same codebook as the codebook used by the Huffman encoder 277. The decoder 130 may calculate a scale factor from the quantized feature vector through the scale factor estimator 313. The scale factor estimator 313 in the decoder 130 may have a same configuration as the scale factor estimator 290 in the encoder 110. The scale factor calculated by the scale factor estimator 313 may have a same value as the scale factor calculated by the scale factor estimator 290.

The decoder 130 may generate a restored normal signal based on the scale factor and a second bitstream into which a quantized adjustment signal is encoded. The decoder 130 may generate a restored adjustment signal by decoding the second bitstream. The decoder 130 may inversely scale the restored adjustment signal according to the scale factor.

For example, the decoder 130 may generate the restored adjustment signal by decoding the second bitstream through the Huffman decoder 331. The Huffman decoder 331 may decode the second bitstream using a same codebook as the codebook used by the Huffman encoder 257. The decoder 130 may inversely scale the restored adjustment signal according to the scale factor through the band-wise inverse scaler 333. The band-wise inverse scaler 333 may generate the restored normal signal by inversely scaling the restored adjustment signal according to Equation 4.

$$\hat{f}_i = \hat{f}_{s,i}/\sigma_b \qquad \text{[Equation 4]}$$

In Equation 4, i denotes an index of a coefficient of the restored adjustment signal and b denotes an index of a band to which the corresponding signal belongs. $\sigma_b$ denotes a scale factor of the b-th band, $\hat{f}_i$ denotes a coefficient of the restored normal signal, and $\hat{f}_{s,i}$ denotes a coefficient of the restored adjustment signal.

The decoder 130 may obtain a restored audio signal in the frequency domain based on a third bitstream, into which a quantized energy is encoded, and the restored normal signal. The decoder 130 may output restored energy of a frequency band of the restored audio signal in the frequency domain based on the third bitstream. The decoder 130 may denormalize the restored normal signal according to the restored energy.

For example, the decoder 130 may output the restored energy of the frequency band by decoding the third bitstream through the Huffman decoder 351. The Huffman decoder 351 may decode the third bitstream using a same codebook as the codebook used by the Huffman encoder 235. The decoder 130 may denormalize the restored normal signal through the band-wise denormalizer 353. The band-wise denormalizer 353 may denormalize the restored normal signal according to Equation 5.

$$\hat{y}_i = \hat{e}_b \hat{f}_i \qquad \text{[Equation 5]}$$

In Equation 5, i denotes an index of a coefficient of the restored normal signal and b denotes an index of a band to which the corresponding signal belongs. $\hat{e}_p$ denotes the restored energy of the b-th band, $\hat{f}_i$ denotes a coefficient of the restored normal signal, and $\hat{y}_t$ denotes a coefficient of the restored audio signal in the frequency domain.

The decoder 130 may output a restored audio signal in the time domain based on the restored audio signal in the frequency domain. The decoder 130 may output the restored audio signal in the time domain through the inverse modified discrete cosine transformer 370. For example, the inverse modified discrete cosine transformer 370 may perform an inverse modified discrete cosine transform on the restored audio signal in the frequency domain and transform a resulting signal into a time-domain signal having a length of L. The inverse modified discrete cosine transformer 370 may apply a window function to the time-domain signal having a length of L. The inverse modified discrete cosine transformer 370 may output the restored audio signal in the time domain by performing an overlap-and-add operation on neighboring signals to which a window function is applied.

The Huffman decoders 311, 331, and 351 may receive a bit for determining a presence of a blank for each frequency band generated by the Huffman encoders 235, 257, and 277 of FIG. 2. For example, the Huffman decoders 311, 331, and 351 may restore all values to "0" when a bit value, with which the presence of a blank is determined, is "1." The Huffman decoders 311, 331, and 351 may compare received energy of a frequency band to a minimum threshold value. The Huffman decoders 311, 331, and 351 may determine a frequency band having energy less than or equal to the minimum threshold value to be blank.

Figure 4:
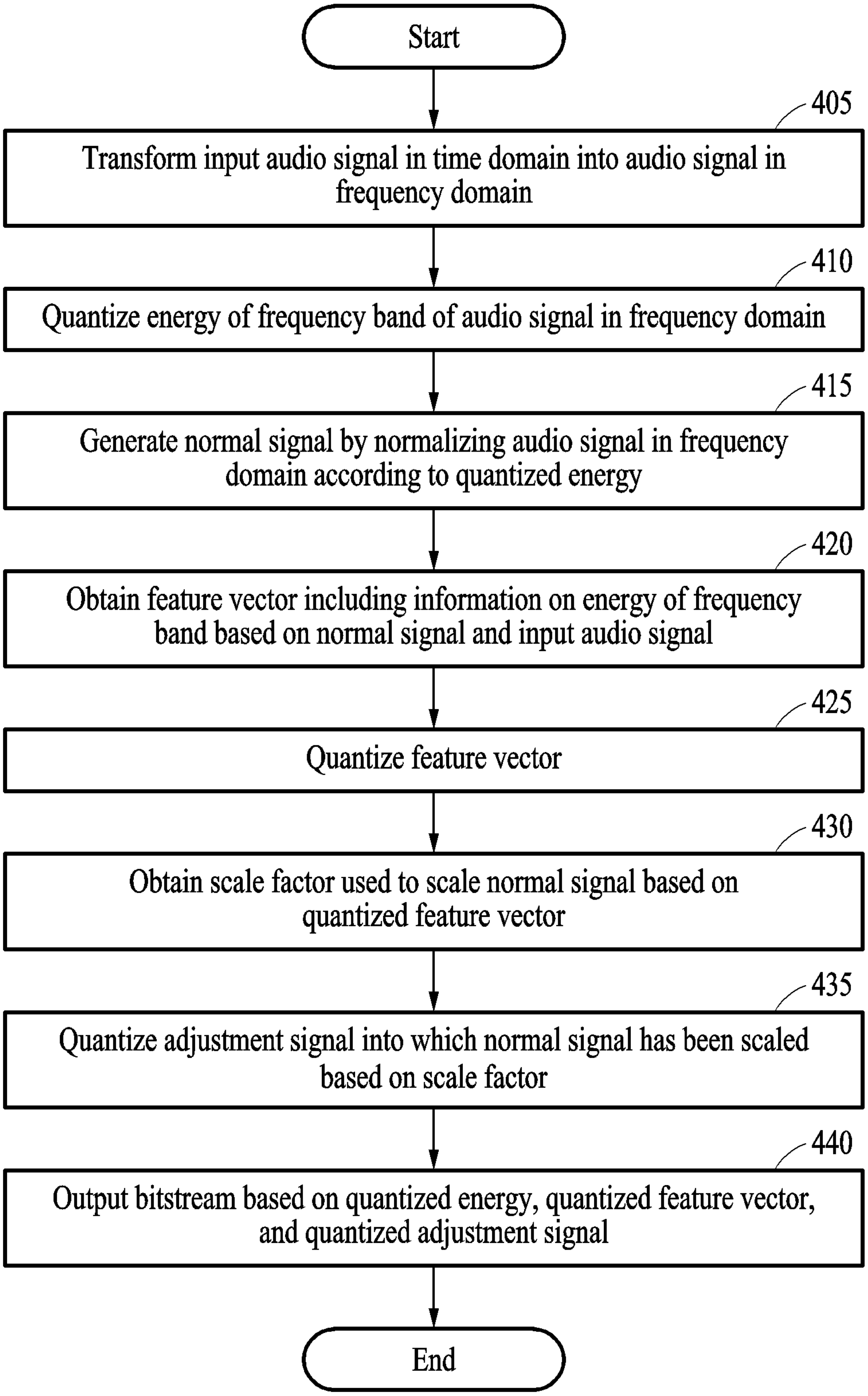
FIG. 4 is a flowchart illustrating an example of an encoding method, according to an embodiment.

FIG. 4 is a flowchart illustrating an example of an encoding method, according to an embodiment.

Operations 405 to 440 may be performed sequentially, but embodiments are not limited thereto. For example, two or more operations may be performed in parallel.

In operation 405, the encoder 110 may transform an input audio signal in a time domain into an audio signal in a frequency domain.

In operation 410, the encoder 110 may quantize energy of a frequency band of the audio signal in the frequency domain.

In operation 415, the encoder 110 may generate a normal signal by normalizing the audio signal in the frequency domain according to the quantized energy.

In operation 420, the encoder 110 may obtain a feature vector including information on the energy of the frequency band based on the normal signal and the input audio signal.

In operation 425, the encoder 110 may quantize the feature vector.

In operation 430, the encoder 110 may obtain a scale factor used to scale the normal signal based on the quantized feature vector.

In operation 435, the encoder 110 may quantize an adjustment signal into which the normal signal has been scaled based on the scale factor.

In operation 440, the encoder 110 may output a bitstream based on the quantized energy, the quantized feature vector, and the quantized adjustment signal.

Figure 5:
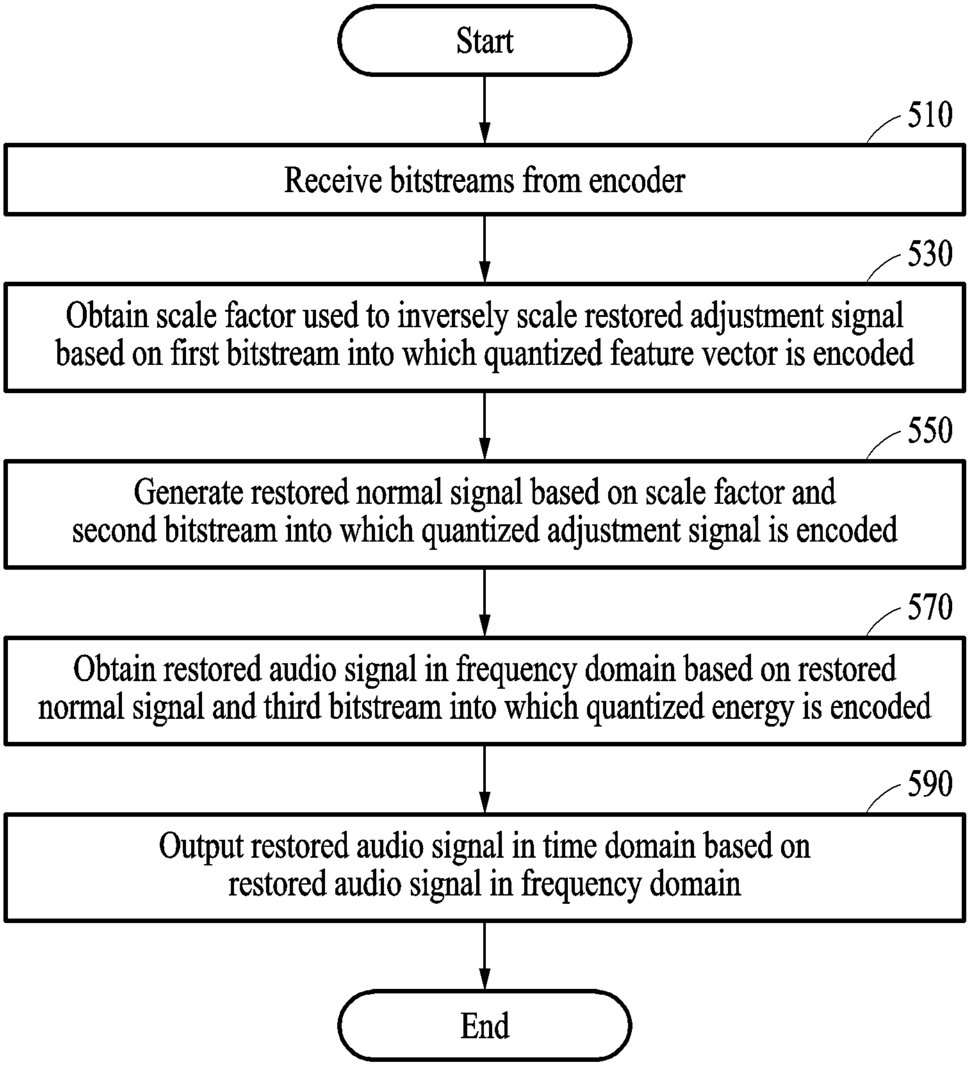
FIG. 5 is a flowchart illustrating an example of a decoding method, according to an embodiment.

FIG. 5 is a flowchart illustrating an example of a decoding method, according to an embodiment.

Operations 510 to 590 may be performed sequentially, but embodiments are not limited thereto. For example, two or more operations may be performed in parallel.

In operation 510, the decoder 130 may receive bitstreams from the encoder 110.

In operation 530, the decoder 130 may obtain a scale factor used to inversely scale a restored adjustment signal based on a first bitstream into which a quantized feature vector is encoded.

In operation 550, the decoder 130 may generate a restored normal signal based on the scale factor and a second bitstream into which a quantized adjustment signal is encoded.

In operation 570, the decoder 130 may obtain a restored audio signal in a frequency domain based on a third bitstream, into which quantized energy is encoded, and the restored normal signal.

In operation 590, the decoder 130 may output a restored audio signal in a time domain based on the restored audio signal in the frequency domain.

Figure 6:
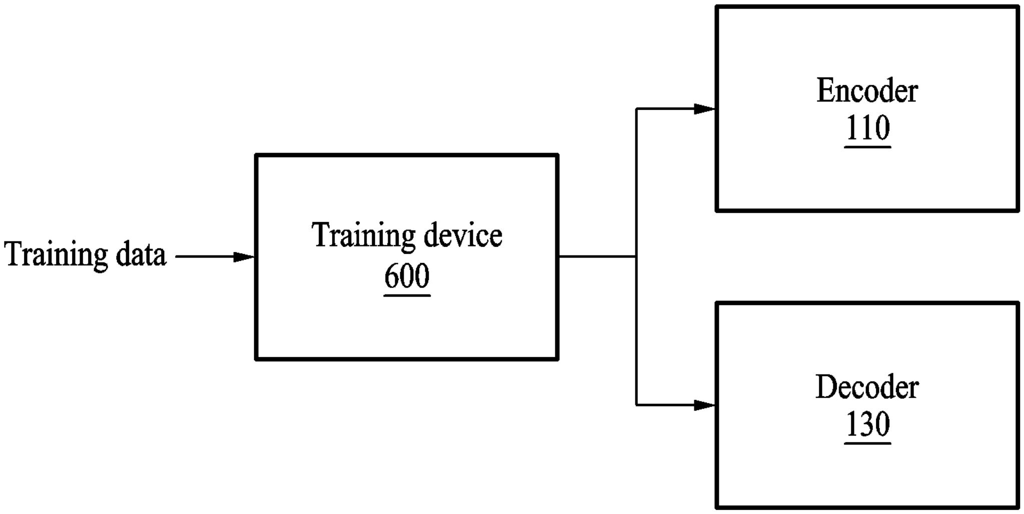
FIG. 6 is a diagram illustrating a method of training an encoder and a decoder, according to an embodiment.

FIG. 6 is a diagram illustrating a method of training an encoder and a decoder, according to an embodiment.

A training device 600 may train the encoder 110 and the decoder 130 of FIG. 1 through the following training process.

A loss function for training may be composed of a weighted sum of distortion $\mathcal{D}$ and a bitrate $\mathcal{R}$ as shown in Equation 6.

$$\mathcal{L} = \mathcal{R} + \lambda\mathcal{D} \quad \text{[Equation 6]}$$

In Equation 6, $\mathcal{L}$ denotes the loss function for training of the encoder 110 and the decoder 130, $\mathcal{D}$ denotes the distortion, and $\mathcal{R}$ denotes the bitrate.

The bitrate $\mathcal{R}$ may be determined to be entropy of each variable calculated through an entropy model. The entropy of each variable may be a lower limit of an average bitstream length that may be achieved when generating an actual bitrate through entropy coding. The entropy model may provide probability density for a specific variable. The entropy model may learn a probability distribution of an input variable and may also estimate a length of the bitstream during entropy coding of the input variable to optimize the bitrate $\mathcal{R}$..

The distortion $\mathcal{D}$ may be calculated according to Equation 7, but embodiments are not limited thereto. The training device 600 may calculate in advance a masking threshold, at which a masking effect occurs in the frequency domain, for an input audio signal. The training device 600 may obtain a distortion signal from a difference between the input audio signal and a final restored audio signal. The training device 600 may transform the distortion signal into a frequency-domain signal and calculate a total amount of the distortion signal greater than the masking threshold to obtain the distortion $\mathcal{D}$.. The masking threshold may be calculated through a psychoacoustic model, but embodiments are not limited thereto. The training device 600 may obtain a magnitude of the masking threshold according to the psychoacoustic model. However, the psychoacoustic model may be used in the training process only and not in actual use of the encoder 110 and the decoder 130.

$$\mathcal{D} = \frac{1}{N}\sum_{i=1}^{N}\max(SPL_i(x-\hat{x}) - M_i(x), 0) \quad \text{[Equation 7]}$$

In Equation 7, x and $\hat{x}$ denote the input audio signal and the final restored audio signal, respectively, $SPL_i(x-\hat{x})$ denotes a magnitude of a sound pressure level of an i-th frequency component, which may be calculated after transforming the distortion signal $x-\hat{x}$ into the frequency domain, $M_i(x)$ denotes the masking threshold calculated for the input audio signal, and N denotes a total number of frequency components.

Figure 7:
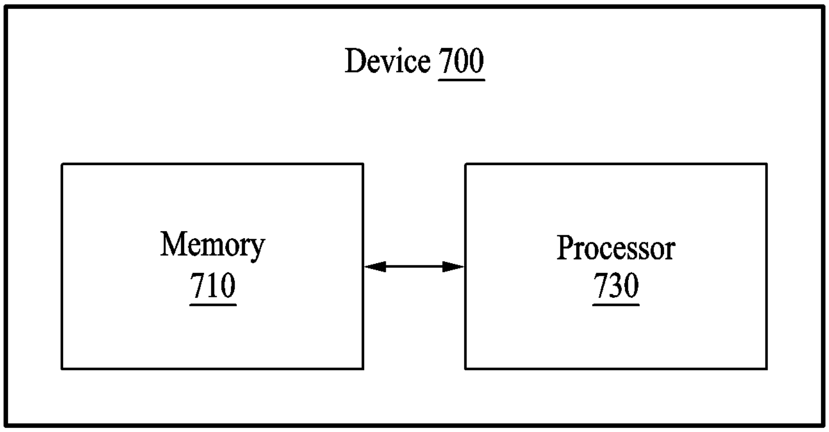
FIG. 7 is a diagram illustrating an example of an apparatus according to an embodiment.

FIG. 7 is a diagram illustrating an example of an apparatus according to an embodiment.

Referring to FIG. 7, a device 700 may include a memory 710 and a processor 730. The device 700 may include the encoder 110 or the decoder 130 of FIG. 1. The device 700 may be a device that includes both the encoder 110 and the decoder 130 of FIG. 1.

The memory 710 may store instructions (or programs) executable by the processor 730. For example, the instructions may include instructions for performing an operation of the processor 730 and/or an operation of each component of the processor 730.

The processor 730 may process data stored in the memory 710. The processor 730 may execute computer-readable code (for example, software) stored in the memory 710 and instructions triggered by the processor 730.

The processor 730 may be a hardware-implemented data processing device having a circuit that is physically structured to execute desired operations. The desired operations may include, for example, instructions or code included in a program.

The hardware-implemented data processing device may include, for example, a microprocessor, a central processing unit (CPU), a processor core, a multi-core processor, a multiprocessor, an application-specific integrated circuit (ASIC), and a field-programmable gate array (FPGA).

Operations of the encoder 110 and the decoder 130 of FIG. 1 and/or the training device 600 of FIG. 6 may be stored in the memory 710 and executed by the processor 730 or embedded in the processor 730. The processor 730 may perform substantially the same operations as the encoder 110 and/or the decoder 130 referring to FIGS. 1 to 5. In addition, the processor 730 may perform substantially the same operation as the training device 600 referring to FIG. 6. Accordingly, a detailed description thereof is omitted.

The components described in the embodiments may be implemented by hardware components including, for example, at least one digital signal processor (DSP), a processor, a controller, an ASIC, a programmable logic element, such as an FPGA, other electronic devices, or combinations thereof. At least some of the functions or the processes described in the embodiments may be implemented by software, and the software may be recorded on a recording medium. The components, the functions, and the processes described in the embodiments may be implemented by a combination of hardware and software.

The examples described herein may be implemented using hardware components, software components, and/or combinations thereof. A processing device may be implemented using one or more general-purpose or special-purpose computers, such as, for example, a processor, a controller, an arithmetic logic unit (ALU), a digital signal processor (DSP), a microcomputer, an FPGA, a programmable logic unit (PLU), a microprocessor or any other device capable of responding to and executing instructions in a defined manner. The processing device may run an operating system (OS) and one or more software applications that run on the OS. The processing device may also access, store, manipulate, process, and create data in response to execution of the software. For purpose of simplicity, the description of a processing device is used as singular. However, one of ordinary skill in the art will appreciate that a processing device may include multiple processing elements and/or multiple types of processing elements. For example, a processing device may include a plurality of processors, or a single processor and a single controller. In addition, a different processing configuration is possible, such as one including parallel processors.

The software may include a computer program, a piece of code, an instruction, or some combination thereof, to independently or collectively instruct or configure the processing device to operate as desired. The software and/or data may be permanently or temporarily embodied in any type of machine, component, physical or virtual equipment, or computer storage medium or device for the purpose of being interpreted by the processing device or providing instructions or data to the processing device. The software may also be distributed over network-coupled computer systems so that the software is stored and executed in a distributed fashion. The software and data may be stored in a non-transitory computer-readable recording medium.

The methods according to the above-described examples may be recorded in non-transitory computer-readable media including program instructions to implement various operations of the above-described examples. The media may also include the program instructions, data files, data structures, and the like alone or in combination. The program instructions recorded on the media may be those specially designed and constructed for the examples, or they may be of the kind well-known and available to those having skill in the computer software arts. Examples of non-transitory computer-readable media include magnetic media such as hard disks, floppy disks, and magnetic tape; optical media such as compact disc read-only memory (CD-ROM) and a digital versatile disc (DVD); magneto-optical media such as floptical disks; and hardware devices that are specially configured to store and perform program instructions, such as read-only memory (ROM), RAM, flash memory, and the like. Examples of program instructions include both machine code, such as those produced by a compiler, and files containing higher-level code that may be executed by the computer using an interpreter.

The above-described hardware devices may be configured to act as one or more software modules in order to perform the operations of the above-described examples, or vice versa.

Although the examples have been described with reference to the limited number of drawings, it will be apparent to one of ordinary skill in the art that various technical modifications and variations may be made in the examples without departing from the spirit and scope of the claims and their equivalents. For example, suitable results may be achieved if the described techniques are performed in a different order, and/or if components in a described system, architecture, device, or circuit are combined in a different manner and/or replaced or supplemented by other components or their equivalents.

Therefore, other implementations, other examples, and equivalents to the claims are also within the scope of the following claims.

What is claimed is:

1. An encoding method, comprising:

transforming an input audio signal in a time domain into an audio signal in a frequency domain;

quantizing energy of a frequency band of the audio signal in the frequency domain;

generating a normal signal by normalizing the audio signal in the frequency domain according to quantized energy;

obtaining a feature vector including information on the energy of the frequency band based on the normal signal and the input audio signal;

quantizing the feature vector;

obtaining a scale factor used to scale the normal signal based on a quantized feature vector;

quantizing an adjustment signal into which the normal signal has been scaled based on the scale factor; and outputting bitstreams based on the quantized energy, the quantized feature vector, and a quantized adjustment signal, wherein the obtaining of the scale factor comprises obtaining the scale factor for each frequency band based on the quantized feature vector, wherein a number of dimensions of the scale factor matches a total number of bands in the frequency band, and wherein a number of dimensions of the quantized feature vector matches a number of dimensions of the feature vector.

2. The encoding method of claim 1, wherein the obtaining of the feature vector comprises:

obtaining a magnitude spectrum of the input audio signal in a frequency domain based on the input audio signal; and obtaining the feature vector based on the magnitude spectrum and the normal signal.

3. The encoding method of claim 2, wherein the obtaining of the feature vector further comprises:

generating a latent representation for extracting the information on the energy of the frequency band based on the magnitude spectrum and the normal signal; and calculating the feature vector based on the latent representation.

4. The encoding method of claim 1, wherein the quantizing of the adjustment signal comprises:

generating the adjustment signal by scaling the normal signal according to the scale factor.

5. The encoding method of claim 1, wherein the outputting of the bitstreams comprises:

outputting a first bitstream by encoding the quantized feature vector;

outputting a second bitstream by encoding the quantized adjustment signal; and outputting a third bitstream by encoding the quantized energy.

6. A decoding method, comprising:

receiving bitstreams from an encoder;

obtaining a scale factor used to inversely scale a restored adjustment signal based on a first bitstream into which a quantized feature vector is encoded;

generating a restored normal signal based on the scale factor and a second bitstream into which a quantized adjustment signal is encoded;

obtaining a restored audio signal in a frequency domain based on a third bitstream, into which quantized energy is encoded, and the restored normal signal; and outputting a restored audio signal in a time domain based on the restored audio signal in the frequency domain, wherein a number of dimensions of the scale factor matches a total number of bands in the frequency band, and wherein a number of dimensions of the quantized feature vector matches a number of dimensions of the feature vector.

7. The decoding method of claim 6, wherein the obtaining of the scale factor comprises:

obtaining a quantized feature vector by decoding the first bitstream; and calculating the scale factor from the quantized feature vector.

8. The decoding method of claim 6, wherein the generating of the restored normal signal comprises:

generating a restored adjustment signal by decoding the second bitstream; and inversely scaling the restored adjustment signal according to the scale factor.

9. The decoding method of claim 6, wherein the obtaining of the restored audio signal in the frequency domain comprises:

outputting restored energy of a frequency band of the restored audio signal in the frequency domain, based on the third bitstream; and denormalizing the restored normal signal according to the restored energy.

10. An encoding device, comprising:

a memory configured to store one or more instructions; and a processor configured to execute the instructions, wherein, when the instructions are executed, the processor is configured to perform a plurality of operations, and wherein the plurality of operations comprises:

transforming an input audio signal in a time domain into an audio signal in a frequency domain;

quantizing energy of a frequency band of the audio signal in the frequency domain;

generating a normal signal by normalizing the audio signal in the frequency domain according to quantized energy;

obtaining a feature vector including information on the energy of the frequency band based on the normal signal and the input audio signal;

quantizing the feature vector;

obtaining a scale factor used to scale the normal signal based on a quantized feature vector;

quantizing an adjustment signal into which the normal signal has been scaled based on the scale factor; and outputting bitstreams based on the quantized energy, the quantized feature vector, and a quantized adjustment signal, wherein the obtaining of the scale factor comprises obtaining the scale factor for each frequency band based on the quantized feature vector, wherein a number of dimensions of the scale factor matches a total number of bands in the frequency band, and wherein a number of dimensions of the quantized feature vector matches a number of dimensions of the feature vector.

11. The encoding device of claim 10, wherein the obtaining of the feature vector comprises:

obtaining a magnitude spectrum of the input audio signal in a frequency domain based on the input audio signal; and obtaining the feature vector based on the magnitude spectrum and the normal signal.

12. The encoding device of claim 11, wherein the obtaining of the feature vector further comprises:

generating a latent representation for extracting the information on the energy of the frequency band based on the magnitude spectrum and the normal signal; and calculating the feature vector based on the latent representation.

13. The encoding device of claim 10, wherein the quantizing of the adjustment signal comprises:

generating the adjustment signal by scaling the normal signal according to the scale factor.

14. The encoding device of claim 10, wherein the outputting of the bitstreams comprises:

outputting a first bitstream by encoding the quantized feature vector;

outputting a second bitstream by encoding the quantized adjustment signal; and outputting a third bitstream by encoding the quantized energy.

* * * * *